April 30, 1968  H. P. C. DANIELS  3,380,150
METHOD AND DEVICE FOR ULTRASONIC WELDING
Original Filed March 5, 1964

INVENTOR.
HENRICUS P.C. DANIËLS
BY
AGENT

United States Patent Office 3,380,150
Patented Apr. 30, 1968

3,380,150
METHOD AND DEVICE FOR ULTRASONIC WELDING
Henricus Petrus Cornelis Daniels, Emmasingel, Eindhoven, Netherlands, assignor to North American Philips Company, Inc., New York, N.Y., a corporation of Delaware
Continuation of application Ser. No. 349,706, Mar. 5, 1964. This application July 31, 1967, Ser. No. 657,421
Claims priority, application Netherlands, Dec. 9, 1963, 289,893
12 Claims. (Cl. 29—470.1)

ABSTRACT OF THE DISCLOSURE

An ultrasonic welding method and apparatus for joining first and second workpieces includes a vibrating member vibrated along a given axis. A movable support member is located adjacent the free end and to one side of the vibrating member and sandwiches the workpieces therebetween. In the preferred embodiment, the support member includes a roller free to rotate about an axis perpendicular to said given axis. The roller and vibrating member are urged together under a preselected force such that said workpieces are simultaneously welded together and propelled in a direction parallel to said given axis.

This application is a continuation of application Ser. No. 349,706, filed Mar. 5, 1964, by Henricus P. C. Daniels.

The invention relates to a method of making a welded joint between two work-pieces by means of an apparatus for the production of ultrasonic vibrations, and to a device for carrying out this method. In known devices of this kind, the ultrasonic vibrations are supplied to a welding tip, preferably through an amplitude transformer. This welding tip presses with a prescribed force against the two workpieces to be welded to one another, which in turn are supported by a stationary supporting member. The energy developed in the welding tip is largely transferred to the said two workpieces and generally is sufficient to weld them to one another. If desired, an electric current may additionally be passed through the two workpieces if the said energy is not sufficient by itself.

Generally, a variety of metals, including metals which are otherwise difficult to weld, such as aluminum, may be joined by this method. Other materials, such as plastics, may also be welded in this manner. The two workpieces generally have the shape of sheets or bands, since this shape is eminently suitable for this method of welding.

It is an object of the present invention to enable a welded joint to be made which extends over a great length. For this purpose it has already been suggested to arrange the workpiece on a rotatable supporting member, while the ultrasonic apparatus together with its amplitude transformer and welding tip rotates about an axis parallel to the axis of rotation of the supporting member. In this method, however, the direction of movement of the ultrasonic vibrations is at right angles to the direction of movement of the workpiece and the resulting welded joint proves to be unsatisfactory. In particular, such a joint cannot claim satisfactory vacuum tightness, as is desired, for example, in sealing metal cans by welding. In addition, the rotary movement about its axis of the ultrasonic apparatus together with its amplitude transformer and welding tip provides complications with respect to the supply of electric energy and the mechanical support of the end of the amplitude transformer.

The invention is characterized in that the two workpieces to be welded to one another are brought into contact with the end of an amplitude transformer which is maintained in ultrasonic vibration. The workpieces are supported by a movable supporting member and are propelled in a direction parallel to the direction of movement of the ultrasonic vibrations.

The invention is based on the remarkable discovery that, if the two workpieces to be welded to one another are sufficiently thin and are supported by a movable supporting member, for example, a member rotatable about an axis at right angles to the direction of movement of the ultrasonic vibrations, these vibrations are capable not only of producing a satisfactory welded joint between the two workpieces but also, with a suitable choice of the static pressure, the electric power and the frequency, of ensuring the transport of the said workpieces. It would appear that the Poisson contraction of the end of the amplitude transformer plays an important part in this effect. Hence, under the said conditions the two workpieces need only to be subjected to the influence of the ultrasonic vibrations for an elongated weld (welded joint) to be made. In this process, care should be taken to ensure that the two workpieces to be welded to one another do not move (are not driven) at so low a speed that an excessive amount of energy is absorbed by the weld with the result that not only a very wide welded joint is produced, but also the workpieces to be welded to one another are liable to be damaged. On the other hand, the transport must not be effected at so high a speed that all the ultrasonic energy at the end of the welding tip is consumed for providing this transport and not for producing the desired welded joint. In this connection it should be noted that any artificial increase of the transporting speed, for example, by using an asymmetrical amplitude transformer (which gives rise to a lesser or greater swinging movement of the welding tip) or by arranging the amplitude transformer so as to be inclined to the area of contact with the workpieces to be welded to one another, so that the welding tip eats into these workpieces and adversely effects the weld, is deprecated. A smooth welding tip is preferably used which is tangent to the surface of the work-pieces to be welded to one another. Satisfactory results are obtained even if the smooth surface of the amplitude transformer itself engages the workpieces to be welded, that is to say, even if there is no welding tip at all.

In order that the invention may readily be carried into effect, an embodiment thereof will now be described, by way of example, with reference to the accompanying diagrammatic drawings, in which.

Figure 1:
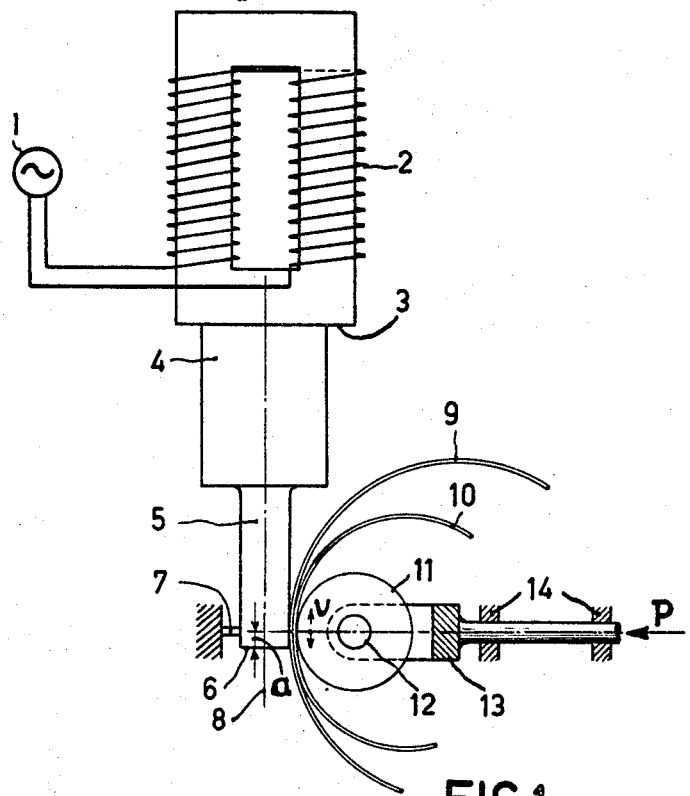
FIG. 1 shows an embodiment of a device according to the invention.

Referring now to FIG. 1, electrical oscillations produced by a generator 1 are applied to a transducer 2, which converts them into ultrasonic mechanical vibrations. These ultrasonic vibrations are radiated by a surface 3 of the transducer and transmitted to an amplitude transformer which comprises two cylindrical portions 4 and 5, the length of each portion being equal to one quarter of the wavelength of the ultrasonic vibrations. The portion 4 has a diameter materially greater than that of the portion 5 so that the surface 6 of the portion 5 performs vibrations in the direction of the axis 8 of the portions 4 and 5, the amplitude of these vibrations materially exceeding that of the radiation surface 3. If desired, however, the amplitude transformer may be a body of revolution having a diameter which gradually decreases in a direction from the radiation surface 3 to the surface 6.

To support the end of the amplitude transformer 4, 5, a thin supporting plate 7 having a length equal to one quarter of the wavelength of the ultrasonic vibration is disposed close to the said end. By using a one quarter wavelength support plate, a minimum amount of vibratory energy is transferred by the portion 5 to the plate 7. The workpieces to be welded to one another are designated by 9 and 10. They may be metal strips having a thickness of the order of 0.2 mm. A particular use of the method according to the invention is the welding together of the cylindrical surface and the cover of a cam, where it is of importance that a vacuum-tight welded joint be achieved. For the sake of clarity, the workpieces 9 and 10 are shown as parts of cylinders having different diameters. However, they may be substantially flat metal strips or discs.

According to the invention, the workpieces 9 and 10 are supported by a movable supporting member in the form of a roller 11 which is mounted for rotation about a spindle 12 in a thrust member 13 provided with guiding means 14. The thrust member is adapted to be pressed towards the supporting plate 7 with an adjustable force P. The force P, the centre of the spindle 12 and the supporting plate 7 preferably are aligned to avoid the occurrence of lateral forces. Preferably, the frequency of the generator 1 is always matched (for example, by deriving a feedback voltage of a synchronising voltage for the generator 1 from the movements of the transducer 2 as described for instance in U.S. patent specification 2,616,223 and British patent specification 912,324 respectively) to the resonant frequency of the entire system, which resonant frequency may vary a few percent when the thrust force is exerted. However, both adjustments are not particularly critical. If desired, the transport speed may be controlled by adjusting the generator frequency or the distance $a$ of the point of contact between the portion 5 and the workpiece 9 from the face 6 of the amplitude transformer 4, 5.

With a suitable choice of the power radiated by the transducer 2 at the given generator frequency and of the thrust force P it may be ensured that the parts 9 and 10 are welded to one another and at the same time are moved in a direction parallel to the axis 8. The portion 5 of the amplitude transformer 4, 5 either does not have a welding tip at all or may be provided with a slightly thickened part acting as a welding tip. This thickened part forms a smooth surface which is in contact with the workpiece 9 but does not eat into it. Furthermore, the distance $a$ is made at least so great that the end of the amplitude transformer cannot eat into the material of the workpiece 9.

Figure 2:
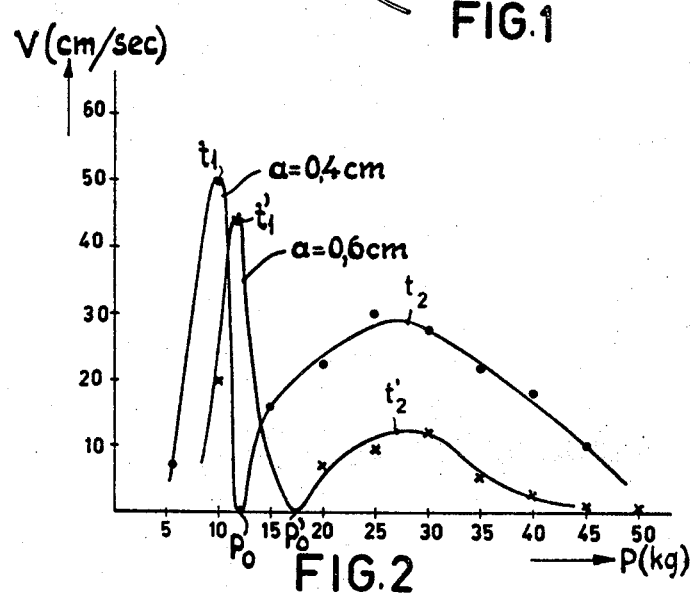
FIG. 2 shows two characteristic curves illustrating the operation of the embodiment of FIG. 1.

In FIG. 2, the speed v in cm./s. at which the workpieces 9 and 10 are driven is plotted as a function of the thrust force P (in kgms.) for two different values of the distance $a$ in cms. It has been found that with a small thrust force P the workpieces 9 and 10 are driven upwards, that is to say, towards the transducer 2, at a speed which may be considerable. If the pressure is increased, it has been found that this speed soon reaches a maximum and then falls off steeply to a value at which no translatory movement v is produced at all (at a pressure $P_0$ and $P_4'$, respectively) at a still higher pressure the direction of movement of the workpieces 9 and 10 reverses so as to be away from the transducer 2. It has been found that at very small and very great pressures satisfactory welds cannot be effected at all. In the proximity of the forces $P_0$ and $P_0'$, respectively, where movement is substantially zero, the welded joint also is generally unsatisfactory, because the workpieces 9 and 10 are over-heated and/or are liable to stick to the portion 5 of the amplified transformer 4, 5. It has been found that the best operating range lies near the peaks $t_2$ and $t_2'$, respectively, of the right-hand parts of the v–P characteristic curves. In any case, a pressure must be used which is greater than a value corresponding to the left-hand peak $t_1$ or $t_1'$, respectively, of these curves but smaller than twice the value corresponding to the peak $t_2$ or $t_2'$, respectively. The correct pressure to be used in a given case depends upon the desired width of the resulting welded joint. In general, the greater is the translatory speed v, the smaller will be the energy available at the welding area and hence the narrower will be the width of the joint. If the strip-shaped workpieces 9 and 10 are thicker, a considerably greater power of the generator 1 must be used to obtain a similar curve. It has been found that with insufficient power within the same pressure range the workpieces 9 and 10 are welded to one another, it is true, but the roller 11 tends to move rather than the work-pieces 9 and 10.

FIG. 2 shows that extensive welded joints may be obtained in a simple manner within a very short period of time. The joint proves to be completely vacuum-tight. If desired, the motion of the workpieces to be welded together may be slightly guided so that the resulting joint remains perfectly straight and/or the workpieces may be subjected to an additional force of attraction which contributes to the transistory movement. Obviously the supporting member constituted by the roller 11 need not be rotatable but may in principle be slidable.

In a practical embodiment it has been found that with the use of a power of 400 watts and an operating frequency varying between 20 and 21 kc./s. at a static pressure P of 25 kgms., aluminum strips having a length of 50 cms. and a thickness of 150 microns can be welded to one another throughout their length within a few seconds. In this embodiment, the portion 5 of the amplitude transformer had a length of 60 mms. and a diameter of 17 mms. while the roller 11 had a diameter of 50 mms. It has been found that with this power and even with twice this power strips having a thickness of 1 mm. can no longer be simultaneously welded and propelled.

What is claimed is:

1. An ultrasonic welding apparatus for joining together first and second workpieces comprising an electromechanical transducer, a vibration-transmitting member coupled thereto, means for energizing said transducer to cause vibration thereof and of said transmitting member in a given direction, a support member movably mounted adjacent the free end of said transmitting member to provide a space between said transmitting member and said support member to accommodate said first and second workpieces to be joined, said support member being mounted so that the area of contact of said support member with the adjacent workpiece is free to move in a direction parallel to said given direction of vibration, and means for urging said support member and said transmitting member towards one another so that said support member presses said workpieces against said transmitting member in a direction that is perpendicular to the direction of vibration of said transmitting member with a preselected force of a magnitude such that said workpieces are welded together and are propelled in a direction parallel to said given direction of vibration, the movement of said workpieces being effected by the force on said workpieces and the vibration of said transmitting member.

2. Apparatus as described in claim 1 wherein said movable support member is mounted so that it can be moved towards the vibration-transmitting member with an adjustable thrust force.

3. Apparatus as described in claim 1 wherein said movable support member comprises a shaft extending perpendicular to said given direction of vibration, a roller member mounted coaxially with said shaft and free to rotate with respect thereto, said movable support member being arranged so that it can be moved towards the vibration-transmitting member with an adjustable thrust force.

4. Apparatus as described in claim 2 wherein said means for urging is adapted to adjust the thrust force within a range of values defined at one end by the value at which the speed of propulsion of the workpieces is a maximum in the direction towards the transducer and by a value at the other end which is twice the value at which the speed of propulsion of the workpieces is a maximum in the opposite direction of propulsion.

5. An ultrasonic welding apparatus for joining together first and second workpieces comprising, an electromechanical transducer, an amplitude transformer coupled thereto, said transformer having a longitudinal axis in a given direction, means for energizing said transducer to cause vibration thereof and of said amplitude transformer in said given direction, a support member including a roller rotatably mounted adjacent the free end of said amplitude transformer and along a side surface thereof to provide a space between said side surface and said support member to accommodate said first and second workpieces to be joined, said support member being mounted for rotation about an axis perpendicular to said given direction, and means for urging said support member and said amplitude transformer towards one another so as to engage said workpieces under a preselected force such that said workpieces are welded together and are propelled in a direction parallel to said given direction of vibration, the movement of said workpieces being effected solely by the force on said workpieces and the vibration of said transformer.

6. An ultrasonic welding apparatus for joining together first and second workpieces comprising an electromechanical transducer, means for energizing said transducer to cause it to vibrate in a given direction, an elongated amplitude transformer coupled to said transducer so as to vibrate in a direction parallel to its longitudinal axis, a rotatably mounted support member positioned adjacent a side surface of said amplitude transformer near the free end thereof so as to provide a space between said side surface and support member to accommodate said first and second workpieces to be joined, said support member being mounted for rotation about an axis which is perpendicular to said longitudinal axis, and means for relatively moving said support member and said amplitude transformer towards one another under a preselected force such that said workpieces are welded together and are simultaneously propelled in a direction parallel to said given direction of vibration, the movement of said workpieces being effected by the applied force on said workpieces and the vibration of said amplitude transformer.

7. Apparatus as described in claim 6 wherein said support member is positioned to one side of said amplitude transformer and out of the line of vibration thereof, said support member being movable in a direction perpendicular to the longitudinal axis of said amplitude transformer thereby to press said workpieces against said side surface of the amplitude transformer.

8. Apparatus as described in claim 6 wherein said support member is positioned to one side of said amplitude transformer and comprises, a thrust member arranged to move perpendicular to said given direction of vibration, and a roller member mounted on said thrust member and free to rotate about an axis which is perpendicular to said given direction of vibration and perpendicular to the direction of movement of said thrust member.

9. Apparatus as described in claim 8 further comprising a second support member fixed in position on the opposite side of said amplitude transformer in abutting relationship therewith, said preselected force being applied to said thrust member along a line which passes through said roller member axis and said second support member.

10. A self-propelling ultrasonic welding apparatus for joining together first and second thin strip-like workpieces comprising, an electromechanical transducer, means for energizing said transducer to cause it to vibrate in a given direction, an elongated amplitude transformer coupled at one end to said transducer so as to vibrate in a direction parallel to its longitudinal axis, a support member positioned to one side of said amplitude transformer adjacent the free end thereof so as to provide a space between the side of the amplitude transformer and the support member to accommodate said first and second workpieces to be joined, said support member comprising a thrust member and a roller member rotatably mounted thereon about an axis which is perpendicular to the direction of vibration of the transformer, and means for moving said support member towards said amplitude transformer in a direction perpendicular to said longitudinal axis so as to sandwich therebetween said first and second workpieces under a preselected force such that said workpieces are welded together and are simultaneously propelled in a direction parallel to said given direction of vibration, the movement of said workpieces being effected by the applied force on said workpiece and the vibration of said transformer.

11. An ultrasonic welding apparatus for joining together first and second workpieces comprising, an electromechanical transducer, a vibration transmitting member coupled thereto, said member having a longitudinal axis in a given direction, means for energizing said transducer to cause vibration thereof and of said transmitting member in said given direction, a support member rotatably mounted adjacent the free end of said transmitting member and along a side surface thereof to provide a space between said side surface and said support member to accommodate said first and second workpieces to be joined, said support member being mounted for rotation about an axis perpendicular to said given direction, and means for urging said support member and said transmitting member towards one another under a preselected force such that said workpieces are welded together and are propelled in a direction parallel to said given direction of vibration, the movement of said workpieces being effected by the force on said workpieces and the vibration of said transmitting member.

12. A method of welding first and second workpieces together by means of a vibrating member comprising, vibrating said member in a direction parallel to its side, bringing said workpieces into contact with said side of said vibrating member, and applying a force to said workpieces in a direction perpendicular to the direction of vibration of said member by utilizing a roller means having an axis of rotation which is perpendicular to the direction of vibration so as to press said workpieces against said vibrating member with a preselected force such that said workpieces are welded together and are simultaneously propelled in a direction parallel to the direction of vibration of said vibrating member, said propulsion being effected by the force on said workpieces and the vibration of said member.

References Cited

UNITED STATES PATENTS

| | | |
|---|---|---|
| 3,193,169 | 7/1965 | Arnold. |
| 3,132,544 | 5/1964 | Jones. |
| 2,946,120 | 7/1960 | Jones et al. _____ 29—470 |

RICHARD H. EANES, JR., *Primary Examiner.*

UNITED STATES PATENT OFFICE
CERTIFICATE OF CORRECTION

Patent No. 3,380,150                                                      April 30, 1968

Henricus Petrus Cornelis Daniels

It is certified that error appears in the above identified patent and that said Letters Patent are hereby corrected as shown below:

In the heading to the printed specification, line 10, "December 9, 1963" should read -- March 6, 1963 --.

Signed and sealed this 23rd day of September 1969.

(SEAL)
Attest:

Edward M. Fletcher, Jr.                              WILLIAM E. SCHUYLER, JR.
Attesting Officer                                               Commissioner of Patents